US009334388B2

(12) United States Patent
Killat

(10) Patent No.: US 9,334,388 B2
(45) Date of Patent: May 10, 2016

(54) DISPERSION POWDER COMPOSITIONS COMPRISING GEMINI SURFACTANTS

(75) Inventor: Marion Killat, Burghausen (DE)

(73) Assignee: Wacker Chemie AG, Munich (DE)

(*) Notice: Subject to any disclaimer, the term of this patent is extended or adjusted under 35 U.S.C. 154(b) by 1075 days.

(21) Appl. No.: 11/923,731

(22) Filed: Oct. 25, 2007

(65) Prior Publication Data

US 2008/0098933 A1 May 1, 2008

(30) Foreign Application Priority Data

Oct. 25, 2006 (DE) .................. 10 2006 050 336

(51) Int. Cl.

| | | |
|---|---|---|
| C08J 3/00 | (2006.01) |
| C08K 5/00 | (2006.01) |
| C08J 3/12 | (2006.01) |
| C04B 24/32 | (2006.01) |
| C04B 40/00 | (2006.01) |
| C08K 5/053 | (2006.01) |
| C08L 23/08 | (2006.01) |
| C04B 103/00 | (2006.01) |
| C04B 103/40 | (2006.01) |
| C04B 111/00 | (2006.01) |
| C04B 111/62 | (2006.01) |
| C08L 29/04 | (2006.01) |
| C08L 71/02 | (2006.01) |

(52) U.S. Cl.
CPC .............. *C08K 5/0008* (2013.01); *C04B 24/32* (2013.01); *C04B 40/0042* (2013.01); *C08J 3/122* (2013.01); *C08K 5/053* (2013.01); *C08L 23/0853* (2013.01); *C04B 2103/0057* (2013.01); *C04B 2103/406* (2013.01); *C04B 2111/00672* (2013.01); *C04B 2111/62* (2013.01); *C08L 29/04* (2013.01); *C08L 71/02* (2013.01); *C08L 2205/03* (2013.01)

(58) Field of Classification Search
CPC ...... C08J 3/122; C04B 24/32; C04B 40/0042; C08K 5/0008; C08K 5/053; C08L 23/0853; C08L 101/00
USPC ......... 524/543, 556, 557, 558, 559, 560, 561, 524/562, 563, 564, 379, 386, 388; 523/340, 523/342
See application file for complete search history.

(56) References Cited

U.S. PATENT DOCUMENTS

| | | |
|---|---|---|
| 2,287,290 A | 6/1939 | Brown |
| 3,287,290 A | 11/1966 | Bray |
| 3,325,425 A | 6/1967 | Bray |
| 5,118,751 A | 6/1992 | Schulze |
| 5,252,704 A | 10/1993 | Bright et al. |
| 5,331,025 A | 7/1994 | Lavoie |
| 5,606,015 A * | 2/1997 | Chiou et al. .................. 528/495 |
| 5,959,017 A | 9/1999 | Eck et al. |
| 6,133,345 A * | 10/2000 | Pakusch et al. ............... 523/342 |
| 6,313,182 B1 * | 11/2001 | Lassila et al. ................. 516/204 |
| 6,632,861 B1 | 10/2003 | Weitzel et al. |
| 6,639,049 B2 | 10/2003 | Weitzel |
| 6,833,401 B1 * | 12/2004 | Xue et al. ...................... 524/401 |
| 2002/0106589 A1 | 8/2002 | Rodney |
| 2002/0107310 A1 | 8/2002 | Shendy et al. |
| 2003/0100671 A1 * | 5/2003 | Pierre et al. ................... 524/710 |
| 2005/0257720 A1 * | 11/2005 | Shendy et al. ................. 106/692 |
| 2007/0167539 A1 * | 7/2007 | Pietsch et al. ................. 523/340 |
| 2008/0102274 A1 * | 5/2008 | Herschke et al. ............. 428/402 |
| 2009/0156732 A1 * | 6/2009 | Rajaraman et al. ........... 524/521 |

FOREIGN PATENT DOCUMENTS

| | | |
|---|---|---|
| DE | 2 049 114 A | 4/1972 |
| DE | 30 28 559 A1 | 2/1982 |
| DE | 195 35 833 A1 | 3/1997 |
| DE | 100 61 410 A1 | 9/2001 |
| DE | 103 26 127 A1 | 12/2004 |
| DE | 10 2004 047 118 A | 4/2006 |
| EP | 0 477 900 A2 | 4/1992 |
| EP | 0 731 128 A1 | 9/1996 |
| EP | 0 765 899 A1 | 4/1997 |
| EP | 1 133 456 A1 | 9/2001 |
| JP | 05132626 A | 5/1993 |
| JP | 06200212 A | 7/1994 |
| JP | 10102088 A | 4/1998 |
| JP | 2004339226 A | 12/2004 |
| WO | 2004/056445 A1 | 7/2004 |
| WO | 2005121188 A1 | 12/2005 |

OTHER PUBLICATIONS

Boujenah, S., et al.; "Gemini Surfactants in Cementitious Application"; Mar. 2, 2004.*
Air Products Press Releases "Foam Doesn't Stand a Chance Against Air Product's Newest Surfynol MD-20 Molecular Defoamer Product", Online, Nov. 12, 2003.
Galgoci E. C. et al.: "Innovative Molecular Defoamer Technology", Air Product Chemicals, (Online) 2004, XP002460300.
English Patbase Abstract corresponding to DE 10 2004 047 118 A1.
English Patbase Abstract corresponding to DE 195 35 833 A1.
English Patbase Abstract corresponding to DE 103 26 127 A1.
English Patbase Abstract corresponding to DE 2 049 114 A.
English Patbase Abstract corresponding to DE 30 28 559 A1.
English Patbase Abstract corresponding to DE 100 61 410 A1.
English Patbase Abstract corresponding to EP 0 477 900 A2.
English Patbase Abstract corresponding to EP 1 133 456 A1.
Tonindustrie-Zeitung, 1985, 9, p. 698 and corresponding English Abstract.
JCT Research, Innovative, Gemini-Type Molecular Defoamer Technology for Improved Coating Aesthetics, vol. 3, No. 1, Jan. 2006, pp. 77-85.

(Continued)

*Primary Examiner* — Peter D Mulcahy
(74) *Attorney, Agent, or Firm* — Brooks Kushman P.C.

(57) ABSTRACT

The invention relates to water-redispersible dispersion powder compositions based on polymers of one or more ethylenically unsaturated monomers, wherein one or more gemini surfactants are present.

25 Claims, No Drawings

(56) References Cited

OTHER PUBLICATIONS

Fox T. G., "Influence of Diluent and of Copolymer Composition on the Glass Temperature of a Polymer System" Bull. Am. Physics Soc. 1, 3, (1956) p. 123.

Polymer Handbook 2nd Edition, J. Wiley & Sons, New York (1975).

H. Egret, Journal of Applied Polymer Science, vol. 82, No. 7, 2001, "Characterization of Grafting in the Emulsion Polymerization of Vinyl Acetate Using Poly(vinyl) Alcohol as Stabilizer". Abstract in the English language.

Stefano Carra, Polymer, vol. 46, No. 4, 2005, "Grafting and Adsorption of poly(vinyl) alcohol in vinyl acetate emulsion polymerization." Abstract in English language.

Wikipedia, Emulsion Polymerization, Non-Surfactant Stabilizers, and ref. 12 cited, pp. 1-7; http://en.wikipedia.org/wiki/Emulsion_polymerization; Dec. 2, 2013.

Air Products reference guide 23361 (2003), "Surfynol, Dynol, and EnviroGem Additives", Feb. 18, 2013.

* cited by examiner

DISPERSION POWDER COMPOSITIONS COMPRISING GEMINI SURFACTANTS

BACKGROUND OF THE INVENTION

1. Field of the Invention

The invention relates to water-redispersible dispersion powder compositions comprising gemini surfactants, a process for producing them and their use in building materials, in particular in self-leveling flooring compositions and screeds.

2. Background Art

Polymers based on vinyl esters, vinyl chlorides, (meth) acrylate monomers, styrene, butadiene and ethylene are used in many applications, particularly in the form of their aqueous dispersions or water-redispersible polymer powders, for example as coating compositions or adhesives for a variety of substrates. In building compositions, for example those based on cement or gypsum plaster, dispersion powders stabilized with protective colloids are used to improve adhesion, abrasion resistance, scratch resistance or the tensile bending strength (Tonindustrie-Zeitung, 1985, 9, page 698). Such dispersion powders are described, for example, in DE-A 2049114 and are produced by spray drying aqueous polymer dispersions with addition of polyvinyl alcohol and further additives. Free-flowing powders having particle sizes of from 10 and 250 µm which can be obtained in this way redisperse in water to form dispersions having particle sizes of from 0.1 to 5 µm. Such redispersions have to remain stable over a relatively long period of time, i.e. they must not tend to settle, in order to be able to be used in the abovementioned applications.

An important field of use for dispersion powders is in hydraulically setting, self-leveling flooring compositions. Such flooring compositions are known from DE-A 3028559 and DE A 10061410 and generally comprise cement or mixtures of various cements, carefully matched filler combinations, dispersion powders, plasticizers and, if appropriate, further additives. The self-leveling flooring compositions are generally delivered to the building site as dry mortar, simply mixed with water on site, and applied to the floor. The applied layer spreads to give a smooth surface which serves either directly as a surface layer or as a substrate for further coatings. Problems can occur here, especially in the application of relatively thick layers. Unevennesses such as craters, pinholes or air inclusions are formed at the surface of the applied layer and represent points of attack for increased abrasion in use. Further treatment of the surface is necessary to alleviate these deficiencies.

To prevent the occurrence of such unevennesses, additives have hitherto been used. Thus, EP-A 477900 recommends the use of fully hydrolyzed copolymers of 1-alkylvinyl esters and vinyl esters. However, such additives are complicated to produce, which is a considerable economic disadvantage for corresponding dispersion powder formulations.

EP-B 1133456 describes an alternative route to a solution using a dispersion powder based on a vinylaromatic-1,3-diene polymer. However, the polymerization of these monomers forms volatile by-products (Diels-Alder compounds) which cannot be removed completely during the production process and are therefore liberated subsequently during use of the dispersion powders or the downstream products of the dispersion powders. This leads to severe odor pollution. This is a great disadvantage, especially in a large-area application such as flooring compositions.

SUMMARY OF THE INVENTION

Against this background, it was an object of the invention to provide alternative dispersion powder compositions, which when used in building material applications, in particular in self-leveling flooring compositions or screeds, counter the occurrence of unevennesses, craters or pinholes on the surface of the applied layer and also the occurrence of air inclusions in the applied layer. These and other objects are achieved by water-redispersible dispersion powder compositions based on polymers of one or more ethylenically unsaturated monomers, wherein one or more gemini surfactants are present.

DETAILED DESCRIPTION OF THE PREFERRED EMBODIMENT(S)

Gemini surfactants are a particular class of surfactant. A gemini surfactant comprises two hydrophilic head groups which are connected by a spacer and each bear a usually hydrophobic tail group.

Gemini surfactants offer a series of advantages over conventional surfactants in which only one hydrophilic head group is joined to a hydrophobic tail group. Gemini surfactants are used as antifoams or surfactants, in particular in water-based coatings of all types (JCT Research, Vol. 3, No. 1, pp. 77-85, 2006; U.S. Pat. Nos. 2,287,290; 3,325,425; DE-A 10326127, DE A 102004047118 or DE-A 19535833).

Preferred gemini surfactants are alkyne derivatives containing two alcohol groups. Preferred gemini surfactants also include alkynediol derivatives in which one or both of the alcohol groups is/are substituted by polyethylene glycol radicals. Preferred gemini surfactants also include reaction products of epoxides with alkynediol derivatives in which one or both of the alcohol groups of the alkynediol derivatives are transformed by means of epoxides.

Particularly preferred gemini surfactants are alkynes of the general formula (1)

where
R and $R^1$ are each a linear or branched, substituted or unsubstituted alkyl, aryl or alkoxyalkyl radical having from 1 to 10 carbon atoms, and
$R^2$ is a hydrogen atom or a polyethylene glycol chain of the formula $(-CH_2-CH_2-O)_n-CH_2-CH_2-OH$ where n=0 to 50. All the above symbols in the general formula (1) have their meanings independently of one another.

R is preferably a hydrocarbon radical having from 1 to 6 carbon atoms, in particular isobutyl, butyl or propyl. $R^1$ is preferably a hydrocarbon radical having from 1 to 6 carbon atoms, in particular methyl or ethyl. $R^2$ is preferably a hydrogen atom.

A very preferred gemini surfactant is the alkynediol derivative of the formula (2), which is also known as Surfynol 104 (trade name of Air Products).

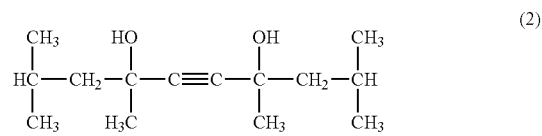 [SMILES: CC(C)CC(C)(O)C#CC(C)(O)CC(C)C]

Particularly preferred gemini surfactants also include reaction products of epoxides with alkynes of the general formula (1), where $R^2$ is in each case a hydrogen atom and one or both of the alcohol groups are transformed by means of epoxides.

Very particularly preferred gemini surfactants are reaction products of epoxides of the general formula (3)

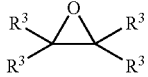
(3)

where the radicals $R^3$ are, independently of one another, hydrogen atoms or linear or branched, substituted or unsubstituted alkyl radicals having 1 to 10 carbon atoms, with the alkynediol derivative of the formula (2), in which one or both of the alcohol groups of the alkynediol derivative of the formula (2) are reacted with epoxides of the general formula (3).

Particularly preferred gemini surfactants also include alkynediol derivatives of the general formula (4)

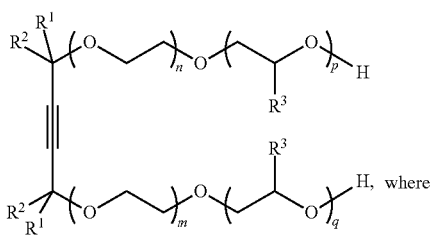
(4)

where $R^1$ is a hydrogen atom or a linear, branched or cyclic alkyl radical having from 1 to 6 carbon atoms,
$R^2$ is a linear, branched or cyclic alkyl radical having from 1 to 12 carbon atoms,
$R^3$ is a hydrogen atom or a $CH_2OR^4$ radical,
$R^4$ is a linear, branched or cyclic alkyl, alkenyl, aryl or aralkyl radical having from 2 to 30 carbon atoms and
(n+m) has an average value of from 1 to 100 and
(p+q) has an average value of from 0.5 to 5.

In the general formula (4), preference is given to $R^1$ being a methyl radical and $R^2$ being a linear, branched or cyclic alkyl radical having from 1 to 6 carbon atoms. Particular preference is given to $R^1$ being a methyl radical and $R^2$ being a linear, branched or cyclic alkyl radical having 4 or 5 carbon atoms. $R^2$ is most preferably an isobutyl or isoamyl radical.

$R^4$ in the general formula (4) is preferably a linear, branched or cyclic alkyl, alkenyl, aryl or aralkyl radical having from 2 to 30 carbon atoms, more preferably a linear, branched or cyclic alkyl, alkenyl, aryl or aralkyl radical having from 4 to 12 carbon atoms. Examples of preferred radicals $R^4$ are ethyl, butyl, hexyl, octyl, 2-ethylhexyl, dodecyl, octadecyl, phenyl and cresyl radicals. Examples of particularly preferred radicals $R^4$ are butyl, 2-ethylhexyl and dodecyl radicals.

(n+m) preferably has a value of from 1 to 50, more preferably a value from 10 to 30, and (p+q) preferably has a value of from 1 to 3, more preferably a value of 2.

A very preferred gemini surfactant of the general formula (4) is the reaction product formed by reaction of two equivalents of [[(2-ethylhexyl)oxy]methyl]oxirane with polyethylene glycol ethers with one equivalent of an alkynediol derivative of the formula (2). The latter reaction product is also known under the name Surfynol® MD-20 (trade name of Air Products).

The proportion of the gemini surfactants based on the total weight of the dispersion powder compositions is from 0.01 to 5.00% by weight, preferably from 0.1 to 2.0% by weight, most preferably from 0.1 to 0.8% by weight.

Preferred base polymers for the water-redispersible dispersion powder compositions are polymers based on one or more ethylenically unsaturated monomers selected from the group consisting of vinyl esters of carboxylic acids having from 1 to 15 carbon atoms, methacrylic esters or acrylic esters of carboxylic acids with unbranched or branched alcohols having from 1 to 15 carbon atoms, olefins or dienes, vinylaromatics or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 5 to 13 carbon atoms, for example VeoVa9® or VeoVa10® (trade names of Shell). Particular preference is given to vinyl acetate.

Preferred methacrylic esters or acrylic esters are esters of unbranched or branched alcohols having from 1 to 15 carbon atoms, e.g. methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Preferred olefins or dienes are ethylene, propylene and 1,3-butadiene. Preferred vinylaromatics are styrene and vinyltoluene. A preferred vinyl halide is vinyl chloride.

If appropriate, from 0.05 to 50% by weight, preferably from 1 to 10% by weight, based on the total weight of the base polymer, of auxiliary monomers can be additionally copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or their salts, preferably vinylsulfonic acid, 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide (NMMA), allyl N-methylolcarbamate, alkyl ethers such as the isobutoxy ether or esters of N methylolacrylamide, of N-methylolmethacrylamide and of allyl N-methylolcarbamate. Also suitable are epoxy-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, with alkoxy groups present being able to be, for example, methoxy, ethoxy and ethoxypropylene glycol ether radicals. Mention may also be made of monomers having hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide and acetylacetoxyethyl acrylate or methacrylate. Further examples are vinyl ethers such as methyl, ethyl or isobutyl vinyl ether.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 12 carbon atoms in the carboxylic acid radical, e.g. vinyl propionate, vinyl laurate, vinyl esters of alpha-branched carboxylic acids having from 5 to 13 carbon atoms, e.g. VeoVa9®, VeoVa10®, VeoVa11®; copolymers of vinyl acetate, from 1 to 40% by weight of ethylene and preferably from 1 to 60% by weight of acrylic esters of unbranched or branched alcohols having from 1 to 15 carbon atoms, in particular n butyl acrylate or 2-ethylhexyl acrylate; and copolymers comprising from 30 to 75% by weight of vinyl acetate, from 1 to 30% by weight of vinyl laurate or vinyl esters of an alpha-branched carboxylic acid having from 5 to 13 carbon atoms and also from 1 to 30% by weight of acrylic esters of unbranched or branched alcohols having from 1 to 15 carbon atoms, in particular n-butyl acrylate or 2-ethylhexyl acrylate, which may additionally contain from 1 to 40% by weight of ethylene; copolymers comprising vinyl acetate, from 1 to 40% by weight of ethylene and from 1 to 60% by weight of vinyl chloride; with the auxiliary monomers mentioned each being able to be present in the polymers in the stated amounts and with the figures in % by weight adding up to 100% by weight in each case.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate and if appropriate ethylene; styrene-acrylic ester copolymers comprising one or more monomers from the group of methyl acrylate, ethyl acrylate, propyl acrylate, n-butyl acrylate, 2-ethylhexyl acrylate; vinyl acetate-acrylic ester copolymers comprising one or more monomers from the group of methyl acrylate, ethyl acrylate, propyl acrylate, n-butyl acrylate, 2-ethylhexyl acrylate and if appropriate ethylene; styrene-1,3-butadiene copolymers; with the auxiliary monomers mentioned each being able to be present in the polymers in the stated amounts and with the figures in % by weight adding up to 100% by weight in each case.

The monomer and the proportions by weight of the comonomers are selected so that a glass transition temperature Tg of from −50° C. to +50° C., preferably from −30° C. to +40° C., generally results. The glass transition temperature Tg of the polymers can be determined in a known way by means of differential scanning calorimetry (DSC). The Tg can also be calculated approximately beforehand by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in kelvin of the homopolymer of the monomer n. Tg values for homopolymers are given in Polymer Handbook 2nd Edition, J. Wiley & Sons, New York (1975).

The present invention further provides a process for producing the water-redispersible dispersion powder compositions by means of emulsion polymerization or suspension polymerization of one or more ethylenically unsaturated monomers in an aqueous medium and subsequent drying of the aqueous dispersions obtained, wherein one or more gemini surfactants are added.

The polymers are preferably produced by the emulsion polymerization process. The polymerization temperature is preferably in the range from 40° C. to 100° C., more preferably from 60° C. to 90° C. The copolymerization of gaseous comonomers such as ethylene, 1,3-butadiene or vinyl chloride can also be carried out under superatmospheric pressure, generally in the range from 5 bar to 100 bar.

The polymerization is initiated by means of the water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Examples of monomer-soluble initiators are dicetyl peroxydicarbonate, dicyclohexyl peroxydicarbonate, dibenzoyl peroxide. The initiators mentioned are generally used in an amount of from 0.001 to 0.02% by weight, preferably from 0.001 to 0.01% by weight, in each case based on the total weight of the monomers.

As redox initiators, use is made of combinations of the initiators mentioned and reducing agents. Suitable reducing agents are the sulfites and bisulfites of the alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is generally from 0.001 to 0.03% by weight, preferably from 0.001 to 0.015% by weight, in each case based on the total weight of the monomers.

To control the molecular weight, regulating substances can be used during the polymerization. If regulators are used, these are usually used in amounts of from 0.01 to 5.0% by weight, based on the monomers to be polymerized, and are introduced separately or are premixed with reaction components. Examples of such substances are n-dodecyl mercaptan, tert-dodecyl mercaptan, mercaptopropionic acid, methyl mercaptopropionate, isopropanol and acetaldehyde.

Suitable protective colloids for the polymerization are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl, hydroxypropyl derivatives, dextrins and cyclodextrins; proteins such as casein or caseinate, soybean protein, gelatins; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthalene formaldehyde sulfonates, styrene-maleic acid and vinyl ether-maleic acid copolymers.

Preference is given to partially hydrolyzed or fully hydrolyzed polyvinyl alcohols having a degree of hydrolysis of from 80 to 100 mol %, in particular, partially hydrolyzed polyvinyl alcohols having a degree of hydrolysis of from 80 to 95 mol % and a Hoppler viscosity in 4% strength aqueous solution of from 1 to 30 mPas (Hoppler method at 20° C., DIN 53015). Preference is also given to partially hydrolyzed, hydrophobically modified polyvinyl alcohols having a degree of hydrolysis of from 80 to 95 mol % and a Hoppler viscosity in 4% strength aqueous solution of from 1 to 30 mPas. Examples are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, olefins such as ethene and decene. The proportion of hydrophobic units is preferably from 0.1 to 10% by weight, based on the total weight of the partially hydrolyzed polyvinyl alcohol. It is also possible to use mixtures of the polyvinyl alcohols mentioned.

Greatest preference is given to polyvinyl alcohols having a degree of hydrolysis of from 85 to 94 mol % and a Hoppler viscosity in 4% strength aqueous solution of from 3 to 15 mPas (Hoppler method at 20° C., DIN 53015). The protective colloids mentioned can be obtained by methods known to those skilled in the art and are generally added in a total amount of from 1 to 20% by weight, based on the total weight of the monomers, in the polymerization.

If the polymerization is carried out in the presence of emulsifiers, they are present in an amount of from 1 to 5% by weight, based on the amount of monomers. Suitable emulsifiers include anionic, cationic and nonionic emulsifiers, for example anionic surfactants such as alkylsulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols or nonionic surfactants such as alkyl polyglycol ethers or alkylaryl polyglycol ethers having from 8 to 40 ethylene oxide units.

After conclusion of the polymerization, a post-polymerization can be carried out according to known methods to remove residual monomers, in general by post-polymerization initiators using a redox catalyst. Volatile residual monomers can also be removed by means of distillation, preferably under reduced pressure, and, if appropriate, passing inert entraining gases such as air, nitrogen or steam through or over the reaction mixture.

The aqueous dispersions which can be obtained in this way have a solids content of from 30 to 75% by weight, preferably from 50 to 60% by weight.

Water-insoluble, film-forming polyaddition and polycondensation polymers such as polyurethanes, polyesters, polyethers, polyamides, melamine-formaldehyde resins, naphthalene-formaldehyde resins, phenol-formaldehyde resins, if appropriate in the form of their oligomeric preproducts, may also be suitable as protective colloids for the polymerization.

To produce the water-redispersible polymer powders, the aqueous dispersions are, if appropriate after addition of protective colloids as drying aid, dried, for example by means of fluidized-bed drying, freeze drying or spray drying. The dispersions are preferably spray dried. Spray drying is carried out in conventional spray-drying units, with atomization being able to be carried out by means of single-fluid, two-fluid or multifluid nozzles or by means of a rotating disk. The outlet temperature is generally chosen in the range from 45° C. to 120° C., preferably from 60° C. to 90° C., depending on the unit, the Tg of the resin and the desired degree of drying.

In general, the drying aid (protective colloid) is used in a total amount of from 3 to 30% by weight, based on the polymeric constituents of the dispersion. Preference is given to using from 5 to 20% by weight based on the polymer content.

Suitable drying aids are partially hydrolyzed polyvinyl alcohols; polyvinylpyrrolidones; polysaccharides in water-soluble form, e.g. starches (amylose and amylopectin), celluloses and their carboxymethyl, methyl, hydroxyethyl, hydroxypropyl derivatives; proteins such as casein or caseinate, soybean protein, gelatins; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthalene formaldehyde sulfonates, styrene-maleic acid and vinyl ether-maleic acid copolymers. Preference is given to further protective colloids other than polyvinyl alcohols as drying aid, with the polyvinyl alcohols preferred as protective colloids also being preferably used as drying aids.

The gemini surfactants can be mixed with the ethylenically unsaturated monomers before initiation of the polymerization. As an alternative, the gemini surfactants can be added during the polymerization of the ethylenically unsaturated monomers. It is likewise possible to add part of the gemini surfactants to the ethylenically unsaturated monomers before initiation of the polymerization and add the remaining part of the gemini surfactants during the polymerization of the ethylenically unsaturated monomers.

The gemini surfactants are preferably added to the polymer dispersion after conclusion of the polymerization. The gemini surfactants are most preferably added before drying of the polymer dispersion. For this purpose, one or more gemini surfactants are added to the aqueous polymer dispersions and the mixtures obtained in this way are subsequently dried by the above-described methods. In an alternative, particularly preferred embodiment, one or more gemini surfactants can also be added during drying of the aqueous polymer dispersions.

As an alternative, the dry polymer powders can also be mixed with one or more gemini surfactants.

In the atomization for drying aqueous polymer dispersions, a content of up to 3% by weight of antifoam, based on the base polymer, has frequently been found to be advantageous. To improve the storage properties by improving the blocking stability, in particular in the case of polymer powders having a low glass transition temperature, the polymer powder obtained can be provided with an antiblocking agent (anticaking agent), preferably up to 30% by weight, based on the total weight of polymeric constituents. Examples of antiblocking agents are calcium carbonate and magnesium carbonate, talc, gypsum, silica, kaolins, metakaolin, calcined kaolin, and silicates, preferably having particle sizes of from 10 nm to 100 µm.

The viscosity of the mixture to be dried is set via the solids content so that a value of <1500 mPas (Brookfield viscosity at 20 revolutions and 23° C.), preferably <500 mPas, is obtained. The solids content of the mixture to be dried is >35%, preferably >40%.

To improve the use properties, further additives can be added during drying. Further constituents of dispersion powder compositions which are present in preferred embodiments are, for example, pigments, fillers, foam stabilizers, hydrophobicizing agents or cement plasticizers.

The water-redispersible dispersion powder compositions are suitable, in particular, for use in building chemical products. They can be used either alone or in combination with conventional polymer dispersions or dispersion powders, if appropriate in combination with hydraulically setting binders such as cements (portland, aluminate, pozzolanic cement, slag cement, magnesia cement, phosphate cement), gypsum plaster and water glass for the production of flow compositions, building adhesives, plasters and renders, knifing fillers, jointing mortars, sealing slurries or paints. Among building adhesives, tile adhesives or thermal insulation adhesives are preferred fields of use for the dispersion powder compositions. Preferred application areas for the dispersion powder compositions are flow compositions, most preferably self-leveling flooring compositions and screeds.

For use in flowable compositions, the dispersion powder composition is mixed into appropriate formulations. Preference is given to adding from 0.5 to 10% by weight of dispersion powder composition. The formulations additionally contain from 5 to 80% by weight of inorganic, hydraulically setting binders such as cement, gypsum plaster or mixtures thereof; preference is given to using cement as binder. Further constituents of the formulation are from 5 to 80% by weight of inorganic fillers such as sand, quartz flour, chalk, ground limestone, filter ash or mixtures thereof. To further improve the flow properties, flow-promoting additives such as casein or cement plasticizers can, if appropriate, be added to the dry mix. The amounts in % by weight are always based on 100% by weight of dry matter of the formulation for the respective flow composition. The ready-to-use flow composition is finally obtained by addition of water to the abovementioned dry mix.

The ready-to-use flow composition can be used for producing self-leveling coatings. It is preferably used as self-leveling flooring composition or for producing screeds.

Application of the self-leveling coatings enables substrates to be leveled, evened out or smoothed. For this purpose, the ready-to-use flow composition is poured onto appropriate substrates, distributed and finally dried. In general, layer thicknesses of from 0.5 to 30.0 mm are obtained. However, smooth surfaces having excellent mechanical strength and hardness are obtained in the procedure according to the invention even when thicker layers, for example layer thicknesses of 40.0 mm or even 50.0 mm, are applied.

The following examples illustrate the invention in detail and are not to be construed as limiting in any respect.

EXAMPLES

Production of the Dispersion Powder Compositions

The powder was produced by spray drying a mixture of an aqueous dispersion of an ethylene-vinyl acetate copolymer (SC=50%) and 8% by weight of a polyvinyl alcohol having a degree of hydrolysis of 88 mol % and a Hoppler viscosity of from 4 to 13 mPas and, if appropriate, an addition of 0.4% by weight of an additive, with the percentages by weight being based in each case on the amount of ethylene-vinyl acetate copolymer used.

The mixture was sprayed by means of a two-fluid nozzle using compressed atomization air at 4 bar. The droplets formed were dried in cocurrent by means of air heated to 125° C. The dry powder obtained was admixed with 20% by weight of commercial antiblocking agent.

Example 1

Dispersion powder composition containing the alkynediol derivative of the formula (2) (also known as Surfynol® 104 (trade name of Air Products)) as additive.

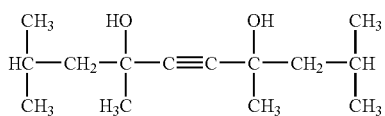
(2)

Example 2

Dispersion powder composition containing Surfynol® MD-20 (trade name of Air Products) as additive. Surfynol® MD-20 is the reaction product of two equivalents of [[(2-ethylhexyl)oxy]methyl]oxirane with polyethylene glycol ether with one equivalent of the alkynediol derivative of the formula (2).

Comparative Example 3

Dispersion powder composition containing Silfoam® SD 860 (trade name of Wacker Chemie) as additive. Silfoam® SD 860 is a self-dispersing silicone antifoam based on organic components with small proportions of an organofunctional silicone oil.

Comparative Example 4

Dispersion powder composition without addition of an additive.

During the course of testing, the powder properties of the dispersion powder compositions obtained according to Examples 1-2 and Comparative Examples 3-4 were determined (see Table 1) and their processing and surface properties in self-leveling flooring compositions were examined (see Table 2).

Determination of the Blocking Resistance (BR):

To determine the blocking resistance, the powder to be examined was introduced into an iron tube with a screw cap and then loaded by means of a metal punch. The tube containing the powder was stored under load at 50° C. for 16 hours in a drying oven. After cooling to room temperature, the powder was removed from the tube and the blocking stability was determined qualitatively by crushing the powder (see Table 1).

The Blocking Stability was Classified as Follows:
1=very good blocking stability
2=good blocking stability
3=satisfactory blocking stability
4=not stable to blocking; powder no longer free-flowing after crushing.

Determination of the Sedimentation Behavior (SB):

The sedimentation behavior of redispersions serves as a measure of the redispersibility of redispersible powders. The powder to be examined was redispersed in a concentration of 50% by weight in water by action of strong shear forces. The sedimentation behavior was then determined on diluted redispersions (solids content=0.5%). For this purpose, 100 ml of this dispersion were introduced into a graduated tube and the height of solid sediment was measured. The result is reported in mm of sedimented material after 24 hours. Values greater than 7 indicate unsatisfactory redispersion of the powder (see Table 1).

Use tests were carried out using flooring compositions having the following constituents:

| | |
|---|---|
| Portland cement | 20% by weight |
| EFA filler (electrofilter ash filler) | 4% by weight |
| Silica sand | 50% by weight |
| Calcium carbonate filler | 22.7% by weight |
| Casein | 0.3% by weight | and, if appropriate, the additives mentioned in the (comparative) examples.

A dry mix was produced by intensive mixing of the listed constituents of the flooring composition and the additives mentioned in the (comparative) examples.

The dried mix was admixed with water (16-18% by weight of water per 100% by weight of dry mix) and intensively mixed. The mortar obtained in this way was poured in a layer thickness of 4 mm onto a film.

Example 5

Flooring composition containing the dispersion powder composition from Example 1 as additive (3% by weight based on the total mass of the flooring composition).

Example 6

Flooring composition containing the dispersion powder composition from Example 2 as additive (3% by weight based on the total mass of the flooring composition).

Comparative Example 7

Addition

Flooring composition containing the dispersion powder composition from Comparative Example 3 as additive (3% by weight based on the total mass of the flooring composition).

Comparative Example 8

Flooring composition containing the dispersion powder composition from Comparative Example 4 as additive (3% by weight based on the total mass of the flooring composition).

Comparative Example 9

Flooring composition containing 2.988% by weight of dispersion powder composition from Comparative Example 4 and 0.012% by weight of the alkynediol derivative of the formula (2) (75% strength on support material; also known under the trade name Surfynol® 104 from Air Products) as additives, with the percentages by weight being based on the total mass of the flooring composition.

Comparative Example 10

Flooring composition containing 2.988% by weight of dispersion powder composition from Comparative Example 4 and 0.012% by weight of Surfynol® MD-20 (trade name of Air Products) as additives, with the percentages by weight being based on the total mass of the flooring composition. Surfynol® MD-20 is the reaction product of two equivalents of the oxirane [[(2-ethylhexyl)oxy]methyl] with polyethylene glycol ether with one equivalent of the alkynediol derivative of the formula (2).

Comparative Example 11

Flooring composition containing 0.12% by weight of Surfynol® MD-20 as additive, with the percentage by weight being based on the total mass of the flooring composition. Surfynol® MD-20 is the reaction product of two equivalents of the oxirane [[(2-ethylhexyl)oxy]methyl] with polyethylene glycol ether with one equivalent of the alkynediol derivative of the formula (2).

Comparative Example 12

Flooring composition without any additive.

Testing of the Nature of the Surface (NS):

The assessment was carried out visually using the following evaluation scale:
1=very smooth, without craters and pinholes
2=very smooth, without craters, few pinholes
3=smooth, few craters, many pinholes
4=smooth, some craters, many pinholes Testing of the Hardness and Scratch Resistance (HS):

The hardness and scratch resistance were tested by scratching with a knife. This at the same gives information about the wear resistance of the composition.

Evaluation Scale:
1=very hard, very strong bond, very scratch resistant
2=hard, strong bond, scratch resistant
3=moderately hard, moderate bond, moderately scratch resistant
4=moderately hard, poor bond, little scratch resistance The results of the testing of the blocking resistance BR and the sedimentation behavior SB of the dispersion powder compositions or dispersion powders are summarized in Table 1; the results for the nature of the surface (NS) and the hardness and scratch resistance HS of the mortars are summarized in Table 2.

TABLE 1

Dispersion powder compositions:

| | Additive | BR | SB |
|---|---|---|---|
| Example | | | |
| 1 | Surfynol® 104 | 2-3 | 1.9 |
| 2 | Surfynol® MD-20 | 1-2 | 1.8 |
| Comparative Example | | | |
| 3 | Silfoam® SD 860 | 2 | 1.7 |
| 4 | — | 2 | 2.2 |

It can be seen from Table 1 that the powder properties of the dispersion powder composition (Table 1, Examples 1 to 2) and the corresponding properties of standard products (Table 1, Comparative Examples 3 to 4) are at a comparatively high level.

However, the use properties of the flooring compositions according to the invention (Table 2, Examples 5 to 6) are significantly better than the corresponding properties of flooring composition comprising dispersion powder compositions containing conventional additives (Table 2, Comparative Example 7) or without additives (Table 2, Comparative Example 8). Direct addition of the gemini surfactants in the production of the dry mix (Table 2, Comparative Examples 9 and 10) does not achieve the use properties of the flooring compositions according to the invention (Table 2, Examples 5 to 6).

In all cases in which no dispersion powder was added to the mortar, mortars having very unsatisfactory surface properties and hardnesses were obtained (Table 2, Comparative Examples 11 to 12). The use properties were particularly unsatisfactory in the case of the mortar described in Comparative Example 12 (Table 2) which contained neither dispersion powder nor a gemini surfactant.

TABLE 2

Self-leveling flooring compositions:

| Example | Powder from Example | NS | HS |
|---|---|---|---|
| 5 | 1 | 2 | 3 |
| 6 | 2 | 2 | 2 |

| Comparative Example | Powder from Comparative Example | | |
|---|---|---|---|
| 7 | 3 | 3 | 2-4 |
| 8 | 4 | 4 | 4 |
| 9[a)] | 4 | 3 | 3 |
| 10[b)] | 4 | 3 | 3 |
| 11[b)] | — | 3 | 3 |
| 12 | — | 4 | 3-4 |

[a)]Surfynol ® 104 was added to the self-leveling flooring composition.
[b)]Surfynol ® MD-20 was added to the self-leveling flooring composition.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A water-redispersible polymer powder, comprising polymer particles prepared by emulsion polymerizing unsaturated monomers in an aqueous medium and spray drying a resulting polymer particle-containing aqueous medium containing from 3-30 weight percent based on polymer solids of protective colloid, and containing at least one gemini surfactant selected from the group consisting of alkynediols and alkynediol derivatives, the water-redispersible polymer powder further optionally comprising one or more antiblocking agents selected from the group consisting of calcium carbonate, magnesium carbonate, talc, gypsum, silica, kaolin, metakaolin, calcined kaolin, silicates, and mixtures thereof, wherein the polymer particles consist of polymerized residues of the unsaturated monomers, wherein the water-redispersible polymer powders redisperse in water to form dispersions containing polymer particles having particle sizes of from 0.1 μm to 5 μm, and wherein the water-redispersible polymer powder is suitable for adding to chemical building products containing hydraulically settable inorganic binders.

2. The water-redispersible polymer powder of claim 1 which is suitable for increasing hardness and/or decreasing voids in a self-leveling hydraulically settable flooring composition when added to the composition in amounts of less than or equal to 10% by weight based on the solids content of the composition.

3. The water-redispersible polymer powder of claim 1, wherein the water-redispersible powders, when used at a 3 weight percent concentration in a self-leveling flooring composition of 20 weight percent Portland cement, 4 weight percent EFA filler, 50 weight percent silica sand, 22.7 weight percent calcium carbonate filler, and 0.3 weight percent casein, produces a higher quality surface than an otherwise similar composition not containing any of said gemini surfactant or containing said gemini surfactant added separately from the water-redispersible polymer powder.

4. The water-redispersible polymer powder of claim 1, wherein the polymer particles consist of residues of monomers selected from the group consisting of vinyl esters of unbranched or branched alkylcarboxylic acids having from 1 to 15 carbon atoms, esters of (meth)acrylic acid with unbranched or branched alcohols having from 1 to 15 carbon atoms, vinylaromatics, olefins, dienes and vinyl halides, and optionally one or more auxiliary monomers in a total amount of from 0.05 to 50 weight percent.

5. The water-redispersible polymer powder of claim 1, wherein the polymer particles consist of residues of monomers selected from the group consisting of vinyl acetate; vinyl acetate together with ethylene; vinyl acetate together with vinyl esters of α-branched monocarboxylic acids having from 5 to 13 carbon atoms; vinyl acetate together with vinyl esters of α-branched $C_9$ carboxylic acids and optionally ethylene; vinyl acetate together with vinyl esters of α-branched $C_{10}$ carboxylic acids and optionally ethylene; vinyl acetate together with vinyl laurate and optionally ethylene; and ethylene together with vinyl esters of α-branched monocarboxylic acids having from 5 to 13 carbon atoms.

6. The water-redispersible polymer powder of claim 1, wherein at least one monomer residue is a residue of a monomer selected from the group consisting of ethyl acrylate, ethyl methacrylate, propyl acrylate, propyl methacrylate, n-butyl, isobutyl or t-butyl methacrylate, methyl acrylate, methyl methacrylate, n-butyl, isobutyl or t-butyl acrylate, 2-ethylhexyl acrylate and norbornyl acrylate.

7. The water-redispersible polymer powder of claim 1, wherein the polymer consists of a vinyl acetate/ethylene copolymer.

8. The water-redispersible polymer powder of claim 1, wherein a gemini surfactant derived from an alkynediol is an alkynediol derivative in which one or both of the alcohol groups of the alkynediol are substituted by polyethylene glycol radicals.

9. The water-redispersible polymer powder of claim 1, wherein the gemini surfactant is a reaction product of an epoxide with an alkynediol.

10. The water-redispersible polymer powder of claim 1, wherein the gemini surfactant includes at least one alkynediol of the formula (1)

$$RR^1(R^2O)C-C\equiv C-C(OR^2)R^1R \quad (1),$$

where
R and $R^1$ are each a linear or branched, substituted or unsubstituted alkyl, aryl or alkoxyalkyl radical having from 1 to 10 carbon atoms and
$R^2$ is a hydrogen atom or a polyethylene glycol chain of the formula $(-CH_2-CH_2-O)_n-CH_2-CH_2-OH$ where n=0.5 to 50, with the individual radicals R, $R^1$ and $R^2$ each have their meanings independently of one another.

11. The water-redispersible polymer powder of claim 1, wherein an alkynediol of the formula (2)

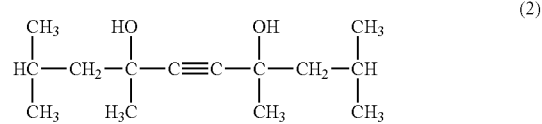 [SMILES: CC(C)CC(C)(O)C#CC(C)(O)CC(C)C]

or the reaction product of two equivalents [[(2-ethylhexyl)oxy]methyloxirane] with polyethylene glycol ether with one equivalent of alkynediol derivative of the formula (2), is used as a gemini surfactant.

12. A process for the preparation of the water-redispersible polymer powder of claim 1, comprising polymerizing one or more ethylenically unsaturated monomers by aqueous emulsion polymerization to form an aqueous dispersion of polymer particles consisting of polymerized residues of said ethylenically unsaturated monomers, and spray drying said aqueous dispersion in the presence of at least one alkynediol or alkynediol derivative gemini surfactant and from 3 to 30% of at least one protective colloid to form a dry water-redispersible polymer powder.

13. The process of claim 12, wherein no antiblocking agent is added.

14. The process of claim 12, wherein an antiblocking agent is added to the dry water-redispersible polymer powder, in an amount of up to 30 weight percent based on the weight of the polymer particles.

15. The process of claim 12, wherein the gemini surfactants are added after completion of the aqueous emulsion polymerization of the ethylenically unsaturated monomers.

16. The process of claim 12, wherein the gemini surfactant is added to polymer dispersion following completion of polymerization and prior to spray drying.

17. The process of claim 12, wherein the gemini surfactants are added during spray drying.

18. A building chemical product comprising at least one hydraulically settable inorganic binder, and a water-redispersible polymer powder of claim 1.

19. The building chemical product of claim 18 which is a self-leveling flooring composition.

20. A building chemical product comprising:
   a) from 5 to 10% by weight of the water-redispersible polymer powder of claim 1;
   b) from 5 to 80% by weight of inorganic, hydraulically setting binders;
   c) from 5 to 80% by weight of inorganic fillers, and
   d) optionally, flow-promoting additives,
wherein the percents by weight are relative to the total weight of the building chemical product.

21. The building chemical product of claim 18, wherein the polymer of the water-redispersible polymer powder is formed by polymerizing monomer(s) selected from the group consisting of ethyl acrylate, ethyl methacrylate, propyl acrylate, propyl methacrylate, n-butyl, isobutyl or t-butyl methacrylate, methyl acrylate, methyl methacrylate, n-butyl, isobutyl or t-butyl acrylate, 2-ethylhexyl acrylate and norbornyl acrylate.

22. The building chemical product of claim 18, wherein the water-redispersible polymer powder consists of a vinyl acetate/ethylene copolymer.

23. The building chemical product of claim 18, wherein no antiblocking agent is present in the water-redispersible polymer powder.

24. The building chemical product of claim 18, wherein the protective colloid is polyvinylalcohol.

25. The building chemical product of claim 18, wherein the polymer of the water-redispersible polymer powder has a glass transition temperature in the range of −50° C. to +40° C.

* * * * *